(12) United States Patent
Simmons

(10) Patent No.: US 9,566,907 B2
(45) Date of Patent: *Feb. 14, 2017

(54) PORTABLE SIGN

(71) Applicant: Sylo Systems, LLC, Upper Marlboro, MD (US)

(72) Inventor: Michael J. Simmons, Upper Marlboro, MD (US)

(73) Assignee: SYLO SYSTEMS, LLC, Upper Marlboro, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,593

(22) Filed: Feb. 25, 2016

(65) Prior Publication Data

US 2016/0167577 A1    Jun. 16, 2016

Related U.S. Application Data

(63) Continuation of application No. 14/388,614, filed as application No. PCT/US2013/032074 on Mar. 15, 2013, now Pat. No. 9,302,617.

(Continued)

(51) Int. Cl.
*B60Q 1/46* (2006.01)
*B60Q 7/00* (2006.01)
(Continued)

(52) U.S. Cl.
CPC . *B60Q 7/00* (2013.01); *B60Q 1/46* (2013.01); *G06F 9/30* (2013.01); *G08G 1/09* (2013.01); *G09F 9/30* (2013.01)

(58) Field of Classification Search
CPC ...................................................... B60Q 7/00
(Continued)

(56) References Cited

U.S. PATENT DOCUMENTS 5,094,023 A    3/1992    McVey
5,132,666 A    7/1992    Fahs
(Continued)

FOREIGN PATENT DOCUMENTS

WO    2013148314 A1    10/2013

*Primary Examiner* — Brent Swarthout
(74) *Attorney, Agent, or Firm* — Edell, Shapiro & Finnan LLC; Richard C. Irving

(57) ABSTRACT

Included is a lightweight portable sign which can be used in one aspect to protect stalled or broken down vehicles with passengers still on board, to prevent oncoming vehicles or traffic from colliding with the stalled vehicles. An infinite number of messages may be displayed by input to the display through the use of a keyboard, smart phone application, auditory input or a pre-set selection of messaged chosen by the user. The sign is computerized with onboard memory, processor and optionally, has sound and audio capabilities. An emergency communications system and method are also included. The method include providing software applications communications components of the sign of the invention which then transmits a signal to a communication center, which then can direct the communication to a hospital, police or roadside assistance entity. The portable sign can also be used to law enforcement or government officials to redirect traffic or provide warnings and messages, or by merchants and vendors to aid in information to potential customers and store visitors. The portable sign can also be provided as an accessory to new vehicles.

14 Claims, 7 Drawing Sheets

Related U.S. Application Data

(60) Provisional application No. 61/617,120, filed on Mar. 29, 2012.

(51) Int. Cl.
  *G09F 9/30* (2006.01)
  *G08G 1/09* (2006.01)
  *G06F 9/30* (2006.01)

(58) Field of Classification Search
  USPC .......... 340/908, 908.1, 815.4, 472, 473, 321
  See application file for complete search history.

(56) References Cited

U.S. PATENT DOCUMENTS

| | | |
|---|---|---|
| 5,257,020 A | 10/1993 | Morse |
| 5,970,639 A | 10/1999 | Hui |
| 6,060,993 A | 5/2000 | Cohen |
| 6,112,443 A | 9/2000 | Stubbs |
| 6,150,996 A | 11/2000 | Nicholson et al. |
| 6,753,788 B1 | 6/2004 | Munyon |
| 6,771,256 B1 | 8/2004 | Abraham et al. |
| 7,064,673 B1 | 6/2006 | Bonham |
| 7,354,180 B2 | 4/2008 | Sawhney et al. |
| 7,859,431 B2 | 12/2010 | Peddie et al. |
| 9,031,872 B1 | 5/2015 | Foster |
| 9,302,617 B2 * | 4/2016 | Simmons ................ B60Q 1/46 |
| 2002/0005826 A1 | 1/2002 | Pederson |
| 2008/0189998 A1 | 8/2008 | Thistlethwaite |
| 2008/0198038 A1 | 8/2008 | Yingst et al. |
| 2010/0031546 A1 | 2/2010 | Nwatu |
| 2010/0109910 A1 | 5/2010 | Fahey |
| 2011/0146119 A1 | 6/2011 | Wagner |
| 2011/0199212 A1 * | 8/2011 | Matityaho ............... G07G 1/009 340/572.7 |
| 2013/0049992 A1 | 2/2013 | Mothaffar |
| 2013/0111377 A1 * | 5/2013 | Newman ................ G06F 3/048 715/764 |
| 2015/0145667 A1 | 5/2015 | Al Shalabi |

* cited by examiner

PORTABLE SIGN

This application is a Continuation of U.S. patent application Ser. No. 14/388,614, filed Sep. 26, 2014, which is a 371 of International Patent Application No. PCT/US2013/032074, filed Mar. 15, 2013, which claims priority to U.S. Provisional Application No. 61/617,120, filed Mar. 29, 2012.

BACKGROUND

Field of the Invention

This invention relates to a portable sign.

Background of the Invention

Numerous lightweight portable signs are available in the market and are of use to motorists (U.S. Pat. No. 5,094,023 to McVey and U.S. Pat. No. 6,112,443 to Stubbs; U.S. Patent Publication No. 2010/0031546 by Nwatu and 2008/0189998 by Thistlewaite), and merchants and others (U.S. Pat. No. 6,150,996). There is a need in the art for a lightweight sign for which the message can be easily changed to suit the needs of the user.

SUMMARY OF THE INVENTION

One aspect of the present invention is drawn to a portable sign which can be used to protect stalled or broken down vehicles with passengers still on board to prevent oncoming vehicles or traffic from colliding with the stalled vehicles.

Another embodiment of the invention is drawn to a portable sign which can be used by law enforcement or government officials to redirect traffic or provide warnings and messages. Included also would be a portable sign usable by merchants and vendors to aid in information to potential customers and store visitors.

Yet another embodiment of the invention is a portable sign provided as an accessory to new vehicles.

An emergency communication system and method is provided which includes communication from the computer components of the sign to a remote communication center or with emergency response vehicles and/or information agencies.

DETAILED DESCRIPTION OF THE INVENTION

Figure 1:
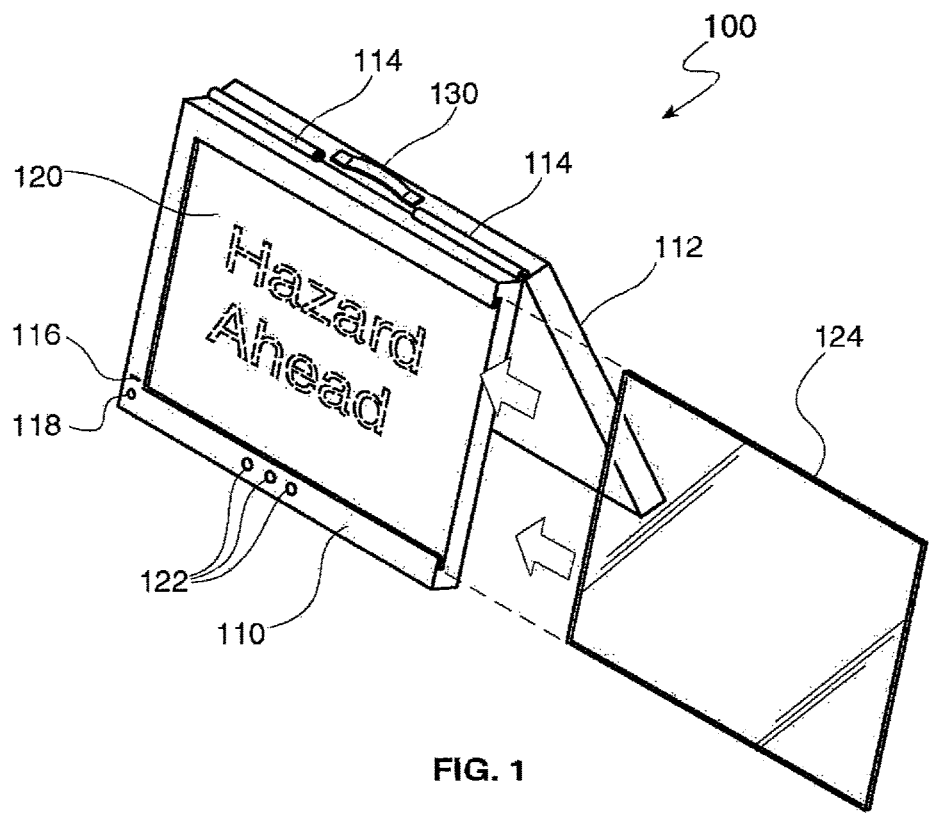
FIG. 1 shows a left-front perspective view of a portable sign of the invention in an open configuration.

The present invention is drawn to a portable sign which can be used to protect stalled or broken down vehicles with passengers still on board to prevent oncoming vehicles or traffic from colliding with the stalled vehicles. Such a sign could also be used to summon medical services, or to inform motorists of dangers ahead such as broken sharp objects in the roadway or an accident. The portable sign of the invention can be used by law enforcement, construction crews and/or government officials to redirect traffic or provide warnings or messages. The portable sign could optionally be provided as an accessory to new vehicles. It is envisioned that the sign can be used in government-issued vehicles, such as emergency response vehicles or police cars for use in accidents or other public events where signage would facilitate emergency or non-emergency government-essential information to motorists or the public.

Also included would be a portable sign usable by merchants and vendors to aid in information to potential customers and store visitors. Such a sign could be easily moved and/or positioned in such a way as to maximize exposure of the sign and its message as necessary. Optionally, the sign could have an audio function. The sign can be linked to inventory-control software to automatically change the message according to how merchandise is moving. The linkage to the sign of the invention can be wireless or hard-wired. Alternatively, the message on the sign can be changed manually by a store employee or owner to display a desired message. The sign can be programmed to also say a message, play music or reproduce an advertising message. The portable mature of the sign allows it to be positioned in different areas or to be carried to a location away from the store for additional advertising exposure. The sign of the invention is also useful for travelling vendors such as for use by crafters at craft shows, farm market vendors, street vendors, flea market vendors, garage sales, and the like.

Yet another embodiment of the invention is a portable sign provided as an accessory to new vehicles. The sign can be included as a factory installed device that has its electronic and control components integrated into a vehicle or it can be a dealer-installed feature which is partially integrated into a vehicle prior to sale and/or delivery to the customer. Alternatively, the sign system can be installed post sale by a mechanic or authorized installer.

An emergency communication system and method is provided which includes communication from the computer components of the sign to a remote communication center or with emergency response vehicles and/or information agencies. The sign system would include communications software and hardware included with the sign, along with a transmitter capable of transmitting a signal to a remote location. The sign would then be capable of transmitting a message either directly to emergency response entities or to a central communications center which could relay the message to emergency response entities. The communication could also take place with an entity which can provide further motorist assistance information, such as information about an accident location or construction to overhead highway signs, smart phone applications, GPS services, to radio traffic reporting entities and the like. A beacon can also be installed that would alert a driver if the sign is removed from a pre-set distance from the driver or vehicle, such as if the driver forgets to collect the sign and drives away, or if the sign is stolen. A remote communication device could be carried on a key fob, be located in the vehicle or be located inside a retail establishment to alert a person to the location of the sign.

FIG. 1 shows an embodiment of a portable sign of the invention 100, with the unit in an open position. The front and left-side perspective of the sign includes an outer casing or frame housing 110 within which a display screen 120 is positioned. The outer casing 110 is made of a plastic, metal, composite, or other appropriately rigid and lightweight material. A rear section 112 is attached by hinges 114 to the front frame housing 110. The rear section 112 is made of foam board, aluminum, plastic or any other light and durable material. Ideally, the materials for both the front 110 and rear 112 portions of the portable sign unit are composed of a static-free or static-reducing material in order to protect any onboard electronics. In the embodiment of FIG. 1, a protective cover 124 is provided to protect the screen. The protective cover 124 could slide onto the unit as shown or alternatively, snap, clip, or be permanently affixed to the sign unit. Control buttons 122 are optionally provided for unit power, screen contrast, display power and the like.

The invention also includes circuitry, a power source, a signal processor/transmission device and a computer microprocessor unit, CPU, computer processing chip or the like, which is programmable with computer code to control the unit for its intended use. Optionally included would either be a dimmer dial, dimmer sensor or the like, to brighten or dim the screen. Alternatively or in combination, control buttons can be provided via a touch screen on the display. One or more SD, USB or similar ports 116 are provided for external memory download to the unit either alone or in combination. Internal memory is provided via a hard drive, RAM or other such device. A recharge port 118 is provided in order to charge an internal battery 340. The charge could be provided through a standard building-mounted electrical outlet, or alternatively, from a vehicle outlet, or both. Adapters and transformers can be provided with the unit to allow for alternative power options. Alternatively, the sign may include solar panel units 360 to provide electric free and continuing power to the unit when used outdoors. A keyboard 140 can be connected to the portable sign via a cable 142 which connects through a USB or similar port 116, or communicates wirelessly with the portable sign unit. Optionally included would be communication with the sign through a smart phone application, iPAD or similar tablet device. A handle 130 allows ease of transport in carrying the portable sign.

The portable sign unit 100 may have a circuit for over-the-air digital or analog signals receipt. The portable sign unit 100 may or may not have one or more sources of sound such as speakers. The device may have one or more microphones or sound recording components. The device may optionally have flash memory, or other built-in memory locations to save files, and music. The device may have a port for interfacing with a PC or other external device. The device has a port 116 for external data cards such as SD cards to interface. A memory device is optionally included in the sign device. Such a memory device includes an SD card, a mini-SD card, a micro-SD card, a computer chip, or a combination thereof. The device has circuitry for interfacing wirelessly with remote or local devices and can communicate wirelessly with one or more devices through a wireless signal. The wireless communication can be accomplished through any known personal area network protocol such as infrared (IR) or BLUETOOTH, or through radio frequency ("RF"), a combination thereof, or the like. Alternatively, the device could have a USB or similar communication access useful for downloading additional programming or information. The sign unit also optionally includes speakers and a microphone. The sign unit may have a circuit for over-the-air digital or analog signals reception.

Onboard circuitry may contain any or all of the necessary components to perform as intended. Proper grounding as known in the art is included. All of the contained circuitry may be connected to the display interface and produces the images necessary for human understanding of the display screen.

The display screen 120 is capable of providing outputs of information provided from any sign-based source, and/or from attached or remote devices. The display may be a touch sensitive screen. The display screen 120 may be LED, plasma or liquid crystal display (LCD). Such screen may be a liquid crystal display (LCD), including, but not limited to, passive or active matrix LCD; thin field transistor LCD; active matrix LCD, such as blue phase, vertical alignment, advanced fringe field switching, in plane switching or twisted nematic; zero-power (bistable) LCD such as ferro liquid display, cholersteric liquid display, zenithal bistable device; or a combination thereof. Optional function buttons 122 each have separate functions and may be push buttons, toggle switches, and the like, for on/off, brighter screen, volume control and so forth or the same functions may be accomplished through the use of a touch screen. The sign may be a composite of one or more of the listed screen types. The sign may have screens on both sides 110 and 112 of the unit. It is understood that the function buttons 122 may be located in any location deemed to be both easily accessible to the user and optimal during manufacturing. The screen may have a color or monochrome display. The screen may be lit by an external light or by a backlit display.

Figures 2, 3, 4:
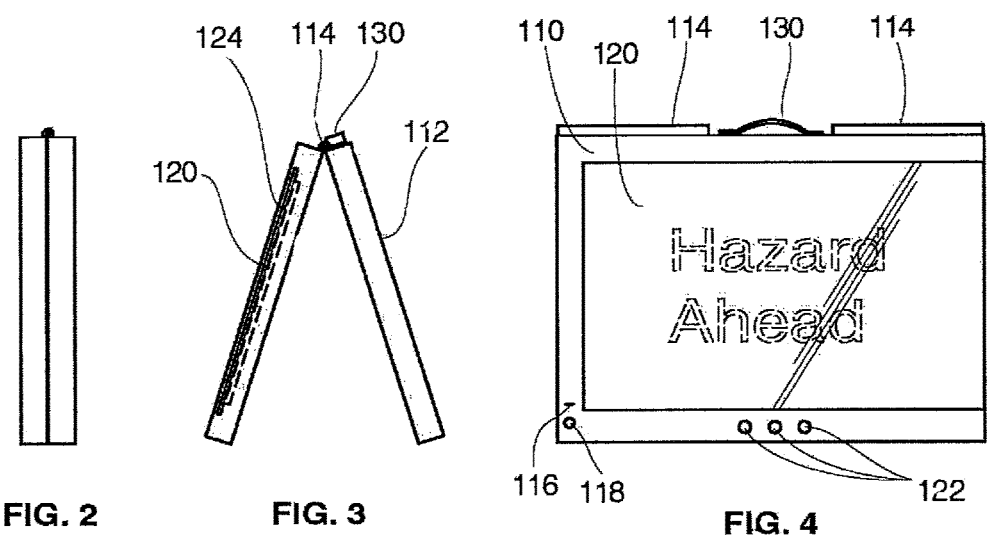
FIG. 2 depicts a side view of a portable sign of the invention in a closed configuration.
FIG. 3 shows a side view of a portable sign of the invention in an open configuration.
FIG. 4 shows the portable sign of the invention from the front view.

FIG. 2 illustrates the portable sign 100 in a closed configuration. In one embodiment, the portable sign can be easily removed from a storage area of a vehicle and deployed where needed, such as adjacent to a disabled vehicle or near a vehicle with a passenger in need of assistance. Storage inside the unit can include a keyboard 140, storage, cables, stakes or other means to secure the unit to the ground to protect against wind, and the like. A side view of the invention is shown in FIG. 3, wherein the sign unit is open.

A front view of the unit 100 is shown in FIG. 4. The handle 130 may be made of any appropriate material such as metal, plastic, leather, woven material, and the like or any combination thereof. The handle can be permanently affixed or attached by VELCRO, buttons, snaps or the like. A shoulder strap is also optionally available and attached to the sides of the unit 100 via commonly known means such as loops, permanent attachment means, snaps, VELCRO and the like. A cover to protect the display screen 124 is provided. Optionally, the screen 120 can be stored facing the inside of the unit 100 and flipped to face the outside when in use. An additional optional embodiment is that the transparent cover 124 is made of a plastic or polymer such as, but not limited to LEXAN, polyethylene polymer, PLEXI-GLASS, acrylic, and the like. Another optional embodiment provides for the screen 120 to be folded inside the unit 100 and the outer housing 110 being hinged to open such that the screen faces outward in use. The size of the unit can vary but must be of a size that both allows for easy viewing from a distance, but also allows for the unit to be portable. A unit to be used in a vehicle would need to fit into standard storage compartments, such as an automobile trunk. Waterproofing of the case 110 and 112, using waterproof materials is desirable for outdoor use. Waterproof materials, such as GORETEX, rubber, neoprene, plastics, and the like, or any combination thereof can be used. The electronic components are also protected from the elements and from water damage.

Figure 5:
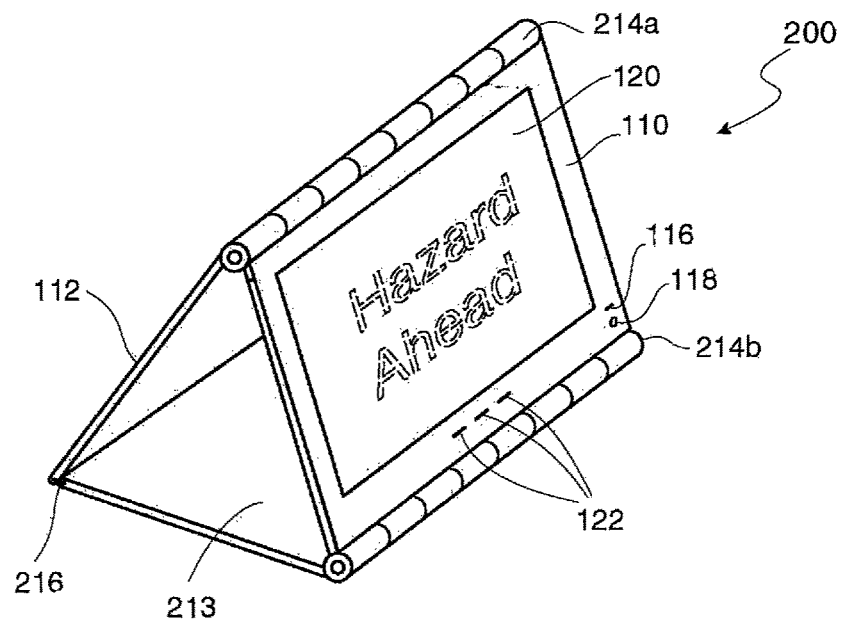
FIG. 5 shows a different embodiment of the invention from a right front perspective view in an open configuration.
Figure 6:
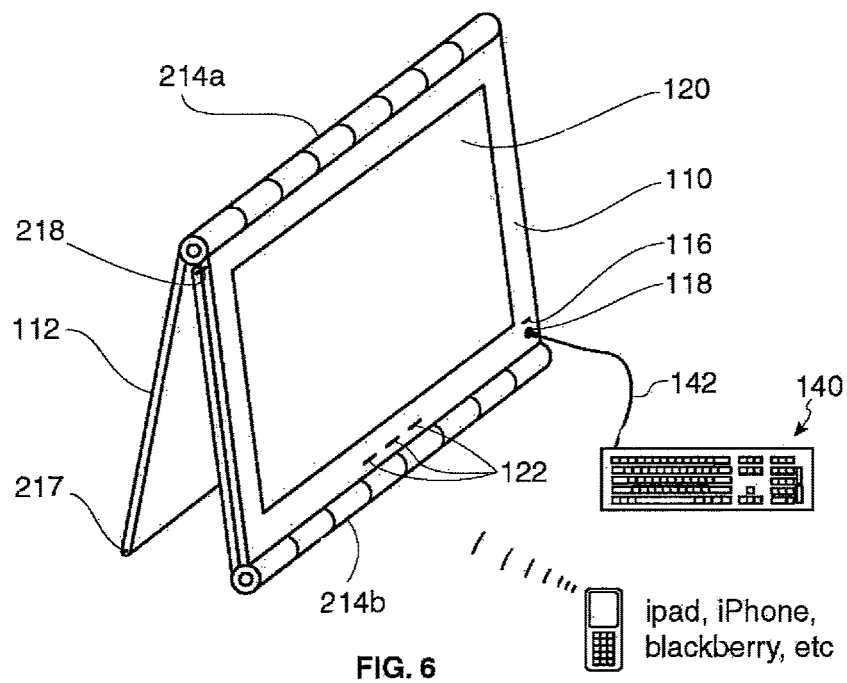
FIG. 6 shows the embodiment of FIG. 5 in an alternative open configuration.
Figure 7:
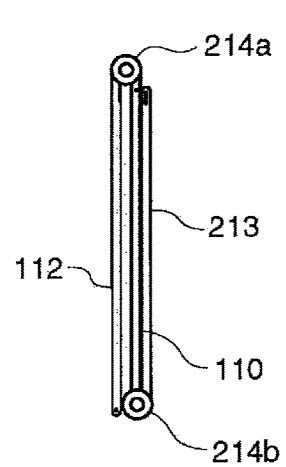
FIG. 7 shows a side view of the portable sign of FIG. 5 in a closed configuration.
Figure 8:
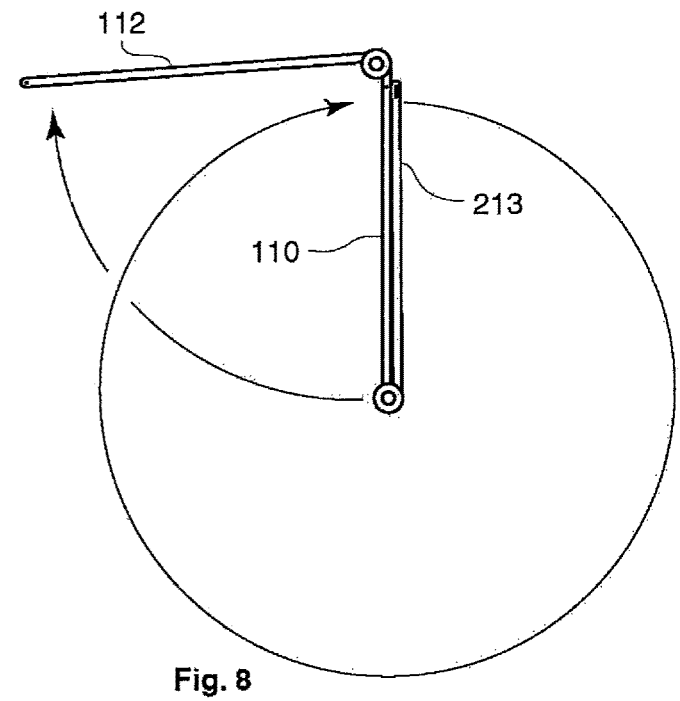
FIG. 8 shows a side view of the opening of the portable sign of FIG. 5.
Figure 9:
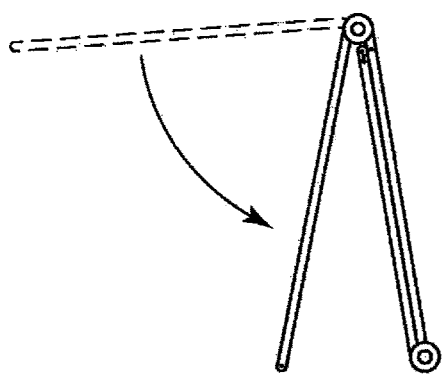
FIG. 9 shows a side view of the closing of the portable sign of FIG. 5.

FIG. 5 illustrates an embodiment of the sign unit of the invention 200, wherein the back cover 112 is hingably attached 214a to the front cover 110 and a third member 213 is attached via a second hinge 214b to the front cover. The third member 213 can be used to support the sign 200 while open and can be fastened by a clasp fastener 216 to the back member 112 by insertion into a fastener port 217, present on the back member 112 for added rigidity and support. Other fasteners are envisioned which can accomplish the same function, such as snaps, interlocking members, locking hinges, or the like. FIG. 6 additionally shows that the third member 213 can be folded behind and parallel to the front member 110 for flexibility in use. The third member 213 can be fastened via a clasp fastener 218 to the front member 110, or alternatively, other fasteners are envisioned which can accomplish the same function, such as snaps, interlocking members, locking hinges, or the like. The message on the sign can be changed by the user, either by input through a keyboard 140, through a smart phone application, through an audio voice recognition command, through a set of pre-programmed displays, or a combination thereof. The messages may be transmitted wirelessly or through a USB device connected via a USB or similar port 118. The keyboard 140 can be stored within the case in a slot or crevice provided for such storage. It is understood that the port 118 may be positioned in any location deemed to be both easily accessible to the user and optimal during manufacturing.

Figure 10:
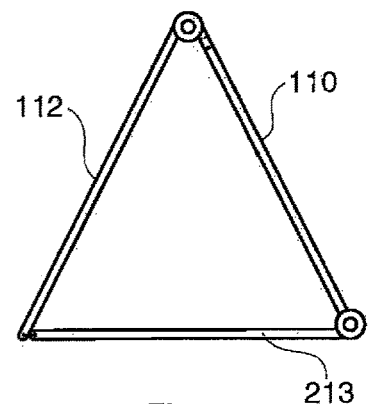
FIG. 10 shows a side view of the portable sign of FIG. 5 in a fully-open configuration.
Figure 11:
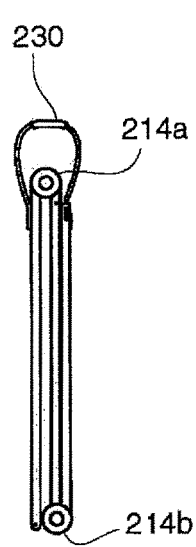
FIG. 11 shows a side view an alternative embodiment of the portable sign in a closed position.
Figure 12:
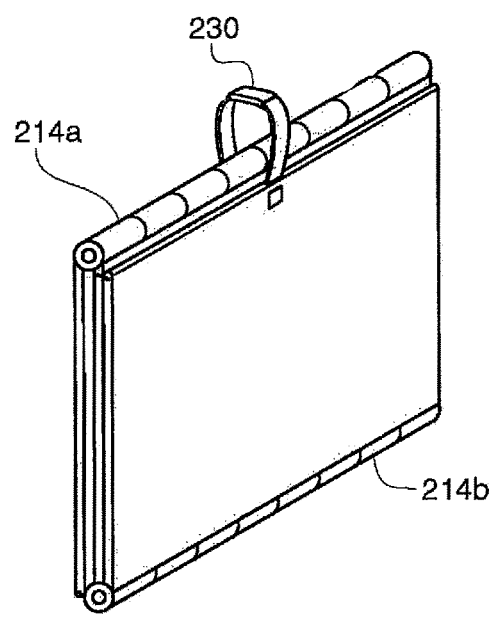
FIG. 12 shows a front perspective view of the portable sign of FIG. 11 in a closed position.

FIGS. 7 through 10 are side views of the embodiments of the sign unit 200, showing the various positions of the front member 110, back member 112 and the third member 213 in relation to each other while closed (FIG. 7), opening (FIG. 8), setting up the sign for use (FIG. 9) and an embodiment where the third member 213 is parallel to the ground surface (FIG. 10). FIGS. 11 and 12 displays an alternative embodiment having a handle 230 attached for ease of transport.

Figure 13:
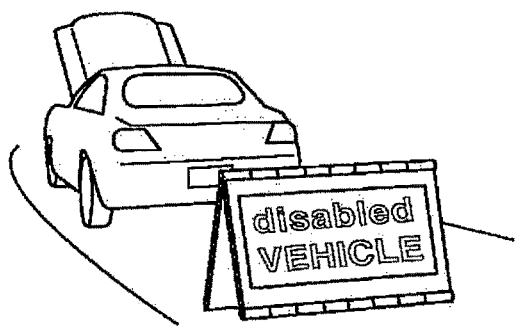
FIG. 13 shows the sign in use with a motor vehicle.
Figure 14:
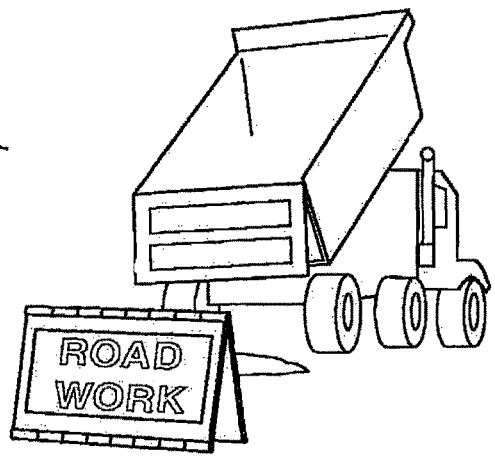
FIG. 14 shows the sign in use at a construction site.
Figure 15:
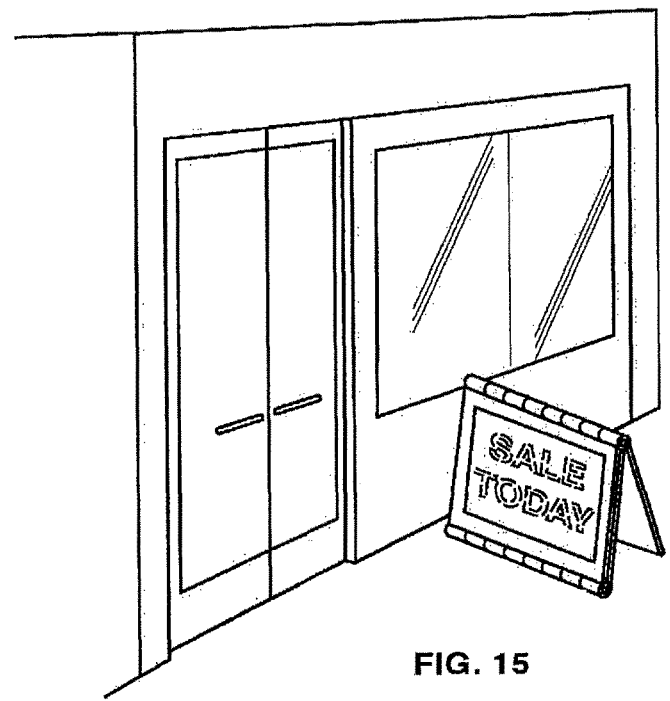
FIG. 15 shows the sign in use at a retail establishment.

FIGS. 13-15 illustrate some embodiments of the invention in use. FIG. 13 shows the sign in use with an automobile. FIG. 14 shows the sign in use at a construction site, and FIG. 15 shows the sign in use at a retail location. The sign while in use at any of the displayed locations may have a communications capability and components installed that will allow for remote communications as described herein. The locations and uses are for illustrative purposes and the uses of the invention are not limited to those shown herein. The messages on the signed can be modified as described above.

Figure 16:
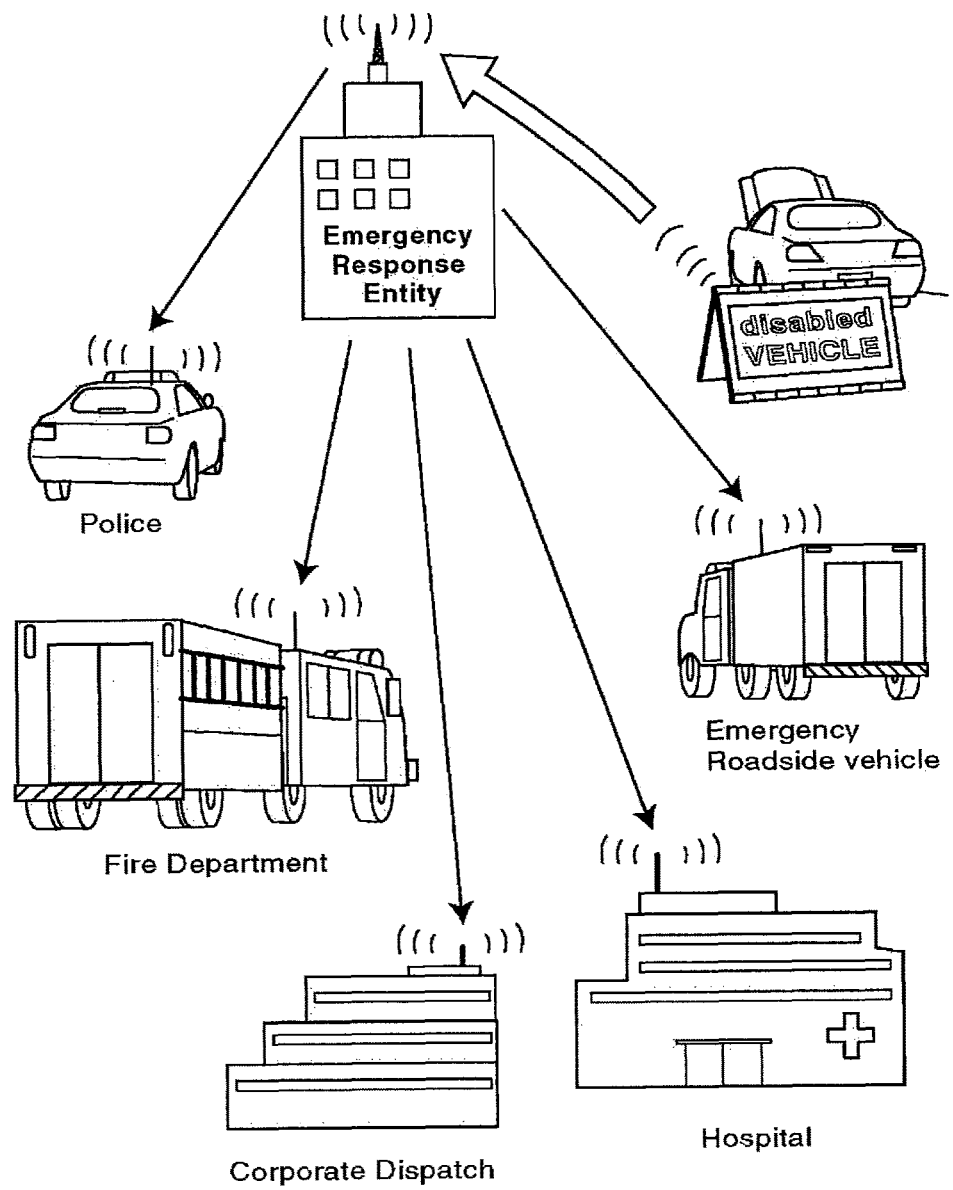
FIG. 16 illustrates an emergency communication system supplied with the sign of the invention.

FIG. 16 illustrates an emergency communications system and method of the invention. The communications components of the sign of the invention transmits a signal to a communications center, which then can direct the communication to a hospital, police or roadside assistance entity, such as AAA, for example. Additionally, an embodiment whereby the sign system and communications components as illustrated in FIG. 16 is integrated into a mass transportation vehicle, in particular a school bus or van is also included in the invention. FIG. 16 illustrates a non-limited set of embodiments of the system and method of the invention in use with a tow vehicle, police car, hospital, road side assistance server, and the like.

Figure 17:
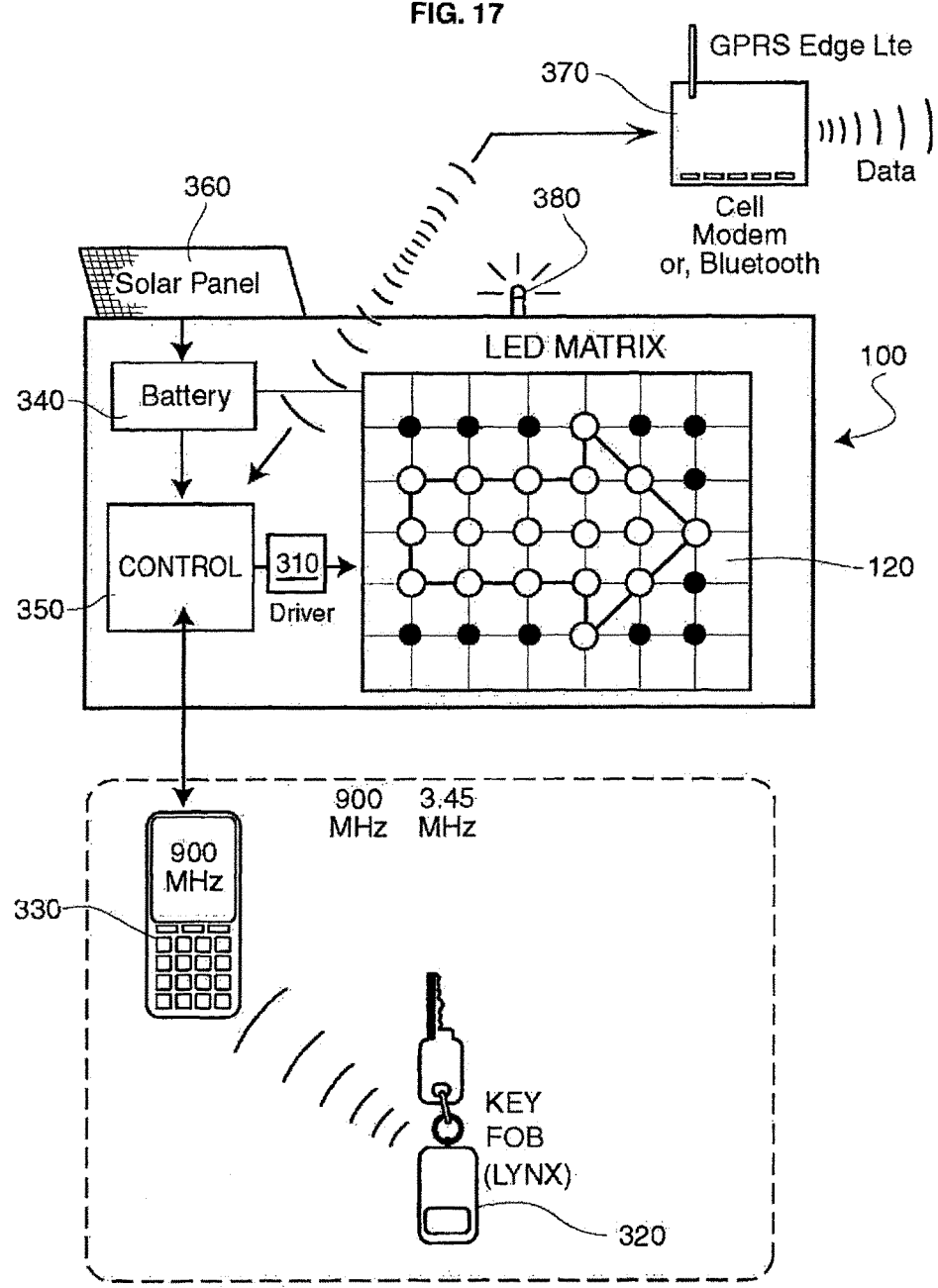
FIG. 17 shows the communication components and capabilities of the portable sign of the invention.

FIG. 17 is a schematic of the communications capabilities and components of the invention. The electronic system architecture for the sign system 100 of the invention includes a commercial off-the-shelf ("COTS") display 120, based on a high-brightness, sunlight-readable LED matrix, LCD screen, OLED screen, or similar, used to convey the message to oncoming traffic by displaying several key indicators such as arrows, warning signs, or flashing notifications, for example. The invention also includes a driver board 310 or unit for driving the LED matrix or similar display, which can include switching or power transistors, field effects transistors ("FETs"), drive circuits, or similar, to supply the necessary higher currents to drive the display. Also included is a low-cost COTS radio receiver 330 and accompanying transmitter or a key fob 320, based on an industrial, scientific and medical ("ISM") band modem, on-off key shifting ("OOK"), frequency key-shifting ("FSK") transceiver, or similar modulation means is used to remotely trigger the on/off state of the unit, as well as to cycle through various pre-programmed indications as available in the sign. A COTS battery pack 340, of lithium-ion, lithium-polymer, or similar rechargeable chemistry, and any associated battery management circuits for providing power to the unit. A controller board 350, based on a microcontroller, microprocessor, or similar, to generate signals for driving the display, managing the radio functions and communication, and controlling the battery management system are also included. A key fob 320 or other portable device is also provided so the user has control of the wireless communication system of the sign unit while away from the sign. The fob system 320 is particularly useful for someone who is injured and away from the vehicle. Also included is a remote keyboard inside a vehicle, so that a user can program the sign safely inside the vehicle without a need to stand alongside of the road typing in information. The invention also includes an alarm that would sound if the fob or an onboard sensor were separated from the sign to prevent a driver from forgetting and leaving the sign behind, or to prevent theft of the sign.

Adding additional functionality to allow for custom indication on the display is additionally included. The sign system allows for the exchange of data communication over the wireless link, which may be an extended feature of the originally utilized wireless modem with additional interfacing. The interface requires the use of a remote keyboard or software that allows the user to custom design signage. Adding additional power features such as solar charging is also included and comprises the incorporating additional power management circuitry and a COTS solar panel 360 or similar means to power the unit. Adding additional wireless features such as BLUETOOTH 370, which includes revising or adding a COTS BLUETOOTH modem or module and developing simple software to allow this control interface functionality via a smartphone application, for instance.

Adding additional wireless features such as mobile network services, comprising revising or adding a COTS cellular modem or module 370, such as general packet radio service ("GPRS"), enhanced data GSM environment ("EDGE"), long term evolution ("LTE") or similar, and coordinating with network providers to allow for the registration of devices on the network, as well as to arrange for a subscription-based access to the network for the exchange of data is also included. GPRS also complements Bluetooth, a standard for replacing wired connections between devices with wireless radio connections. In addition to the internet protocol ("IP"), GPRS supports X.25, a packet-based protocol that is used mainly in Europe, and is also included in the invention. GPRS is a step toward an enhanced data GSM environment and universal mobile telephone service ("UMTS"), all of which are included in the invention. A light beacon, 380 is also included on the sign for additional visual emergency indicator. The features of the invention can be executed with the addition of the mobile network capability and coordination with chosen assistance companies.

A method of mobile applications that allows the user to remotely control the unit is included in the invention. The steps of the method include providing software applications communications components of the sign of the invention which transmits a signal to a communications center, which then can direct the communication to a hospital, police or roadside assistance entity, such as AAA, for example as shown in FIG. 16. The method of the invention includes a non-limited set of embodiments of the invention in use with a tow vehicle, police car, hospital, road side assistance server, and the like. The method includes the use of a key fob or other portable device so the user has control of the wireless communication system of the sign unit while away from the sign. The fob system is particularly useful for someone who is injured and away from the vehicle. Also included is the use of a remote keyboard inside a vehicle, so that a user can program the sign safely inside the vehicle without a need to stand alongside of the road typing in information. The invention also includes the use of an alarm that would sound if the fob or an onboard sensor were separated from the sign to prevent a driver from forgetting and leaving the sign behind, or to prevent theft of the sign.

FIG. 17 illustrates the method of the communications capabilities and components of the invention. The method includes the use of an electronic system architecture for the sign system 100 of the invention, which includes a COTS display 120, based on a high-brightness, sunlight-readable LED matrix, LCD screen, OLED screen, or similar, used to convey the message to oncoming traffic by displaying several key indicators such as arrows, warning signs, or flashing notifications, for example. The invention also includes the use of a driver board 310 or unit for driving the LED matrix or similar display, which can include switching or power transistors, FETs, drive circuits, or similar, to supply the necessary higher currents to drive the display. The method also includes the use of a low-cost COTS radio receiver 330 and accompanying transmitter or a key fob 320, based on an ISM band modem, OOK, FSK transceiver, or similar modulation means is used to remotely trigger the on/off state of the unit, as well as to cycle through various pre-programmed indications as available in the sign. The method includes the use of a COTS battery pack 340, of lithium-ion, lithium-polymer, or similar rechargeable chemistry, and any associated battery management circuits for providing power to the unit. The method includes the use of a controller board 350, based on a microcontroller, microprocessor, or similar, to generate signals for driving the display, managing the radio functions and communication, and controlling the battery management system are also included.

Adding additional functionality to allow for custom indication on the display is additionally included. The sign system methods allows for the user to input information that leads to the exchange of data communication over a wireless link, which may be an extended feature of the originally utilized wireless modem with additional interfacing. The use of the interface requires the use of a remote keyboard or software that allows the user to custom design the sign message. The method requires additional power features, such as solar charging incorporates additional power management circuitry and a COTS solar panel 360 or similar means to power the unit. Adding additional wireless features such as BLUETOOTH, which includes revising or adding a COTS BLUETOOTH modem or module and developing simple software to allow the user to control the interface functionality via a smartphone application, for instance.

Adding additional wireless features such as mobile network services, comprising revising or adding a COTS cellular modem or module 370, such as GPRS, EDGE, LTE or similar, and coordinating with network providers to allow the registration of devices on the network, as well as for the user to arrange for a subscription-based access to the network for the exchange of data is also included. The method also includes GPRS, which also complements BLUETOOTH, a standard for replacing wired connections between devices with wireless radio connections. The position of the user can be further accomplished by the activation of a light beacon, 380 for additional emergency signaling. The features of the method can be executed with the addition of the mobile network capability and coordination with chosen assistance companies.

Having now fully described this invention, it will be understood to those of ordinary skill in the art that the same can be performed within a wide and equivalent range of conditions, formulations, and other parameters without affecting the scope of the invention or any embodiment thereof. All patents and publications cited herein are incorporated by reference in their entirety.

I claim as my invention:

1. A portable sign unit comprising:
   a. electronic components comprising: circuitry, a power source, a signal processor/transmission device, one or more memory storage devices, and a computer microprocessor unit which is programmable with computer code to control the portable sign unit;
   b. internal memory;
   c. a display screen, capable of providing outputs of information provided from a sign-based source, an attached device or a remote communication device;
   d. a communications component capable of receiving signals from a remote communication device, wherein the signals are transmitted wirelessly through BLUETOOTH, a wireless transmitter, infrared, WiFi, or a radio frequency device; or alternatively, the signals are received through a USB device, direct input through a keyboard, touch screen, laptop, tablet computing device, from a preprogrammed display from the one or more memory storage devices; or from a mobile network service; and
   e. wherein a beacon on the portable sign unit provides information to a vehicle driver that the portable sign unit is removed from a pre-set distance from the vehicle or the vehicle driver.

2. The portable sign unit of claim 1, wherein the portable sign unit is powered by a solar power unit.

3. The portable sign unit of claim 1, further comprising at least one item selected from a group of items consisting of a speaker and a microphone.

4. The portable sign unit of claim 1, wherein the display screen is hingably-connected to a support member for support during use.

5. The portable sign unit of claim 4, wherein a second display screen is located on a rear portion of the portable sign unit.

6. The portable sign unit of claim 1, further comprising: a recharge port.

7. The portable sign unit of claim 1, wherein the display screen is positioned within a casing of the portable sign unit and is visible through an opening in the casing on a front portion of the portable sign unit.

8. The portable sign unit of claim 7, further comprising a storage area within the casing of the portable sign unit for storage of a keyboard.

9. The portable sign unit of claim 1, further comprising a port for external memory download to the portable sign unit.

10. The portable sign unit of claim 9, wherein the port is either a SD slot or a USB port.

11. The portable sign unit of claim 1, further comprising a cover to protect the display screen.

12. The portable sign unit of claim 1, further comprising waterproofing materials selected from a group consisting of GORETEX, rubber, neoprene, plastics, and any combination thereof.

13. The portable sign unit of claim 1, wherein a user can change a message displayed by the portable sign unit via an audio voice recognition command.

14. The portable sign unit of claim 1, wherein the portable sign unit is linked to an inventory control system such that a message displayed on the display screen is changed based on movement of merchandise.

* * * * *